March 20, 1962

J. V. BAUER 3,025,963

PRODUCTS USEFUL AS FILTERING DEVICES
AND METHODS OF MAKING THEM

Filed March 13, 1958

INVENTOR:
JORDAN V. BAUER
BY
ATT'YS

March 20, 1962 J. V. BAUER 3,025,963
PRODUCTS USEFUL AS FILTERING DEVICES
AND METHODS OF MAKING THEM
Filed March 13, 1958 3 Sheets-Sheet 2
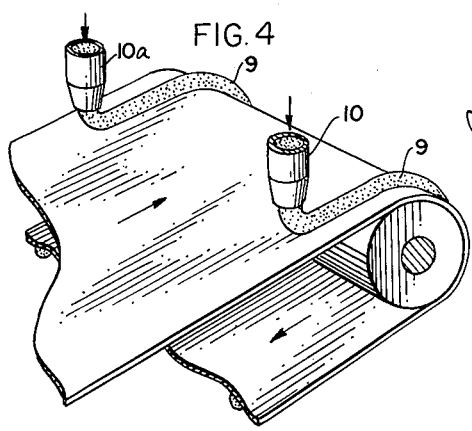
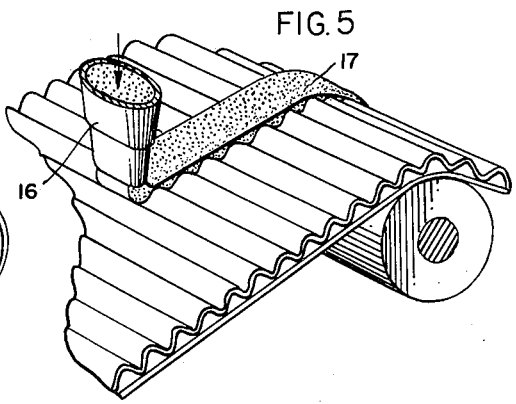
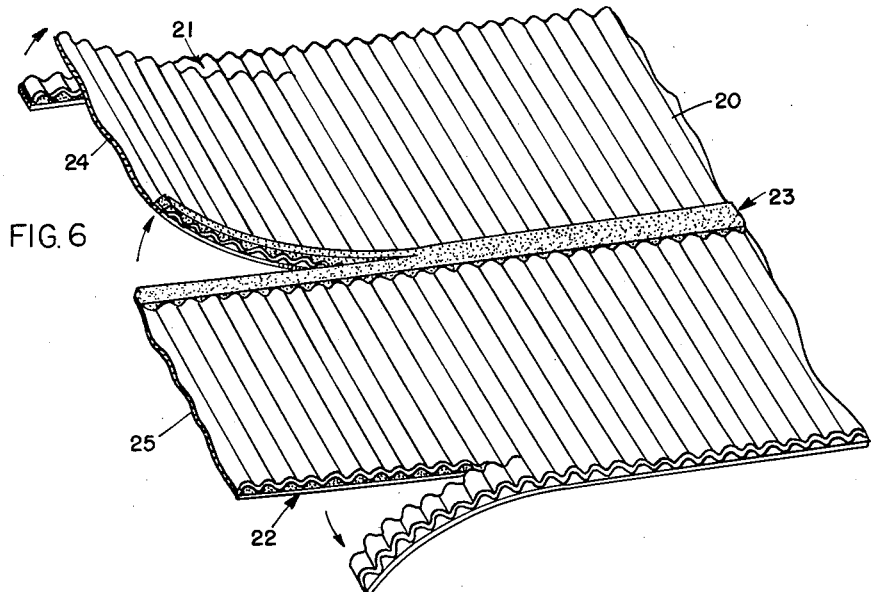
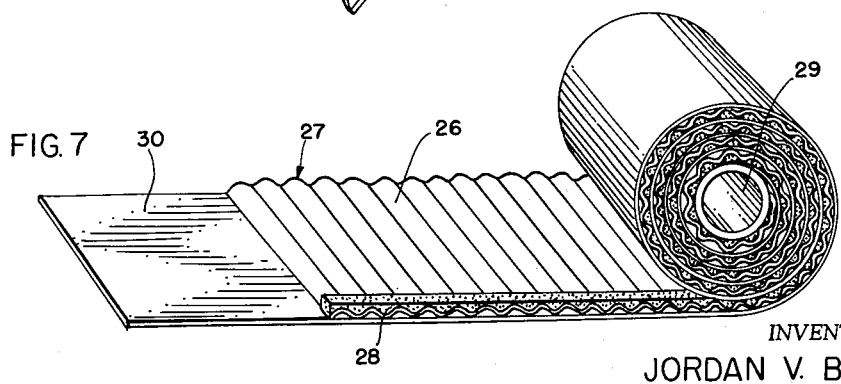
INVENTOR:
JORDAN V. BAUER
BY
ATT'YS March 20, 1962 J. V. BAUER 3,025,963
PRODUCTS USEFUL AS FILTERING DEVICES
AND METHODS OF MAKING THEM
Filed March 13, 1958 3 Sheets-Sheet 3
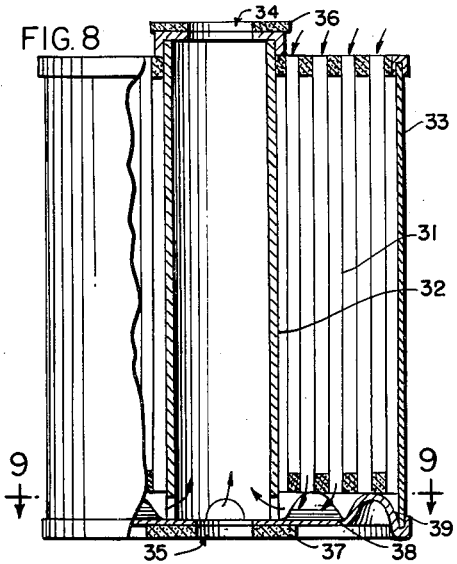
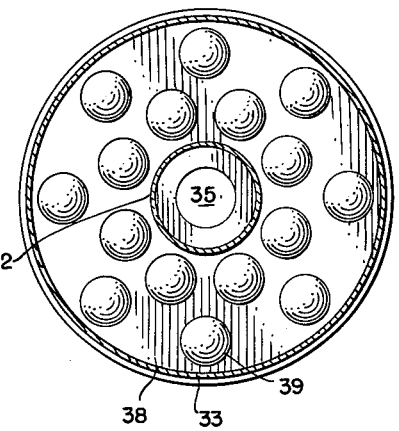
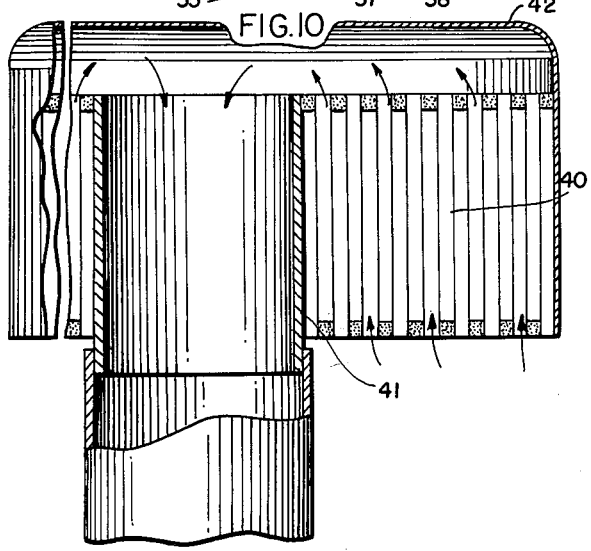
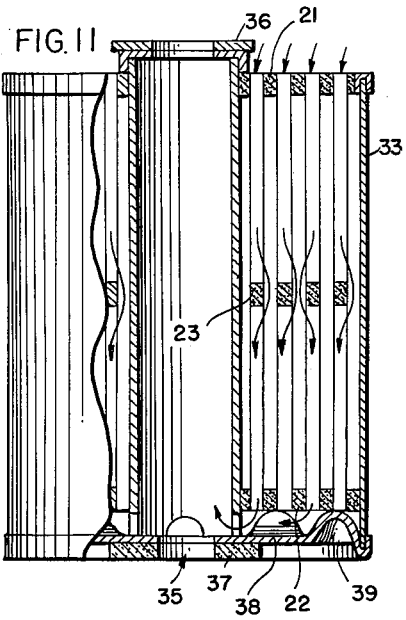
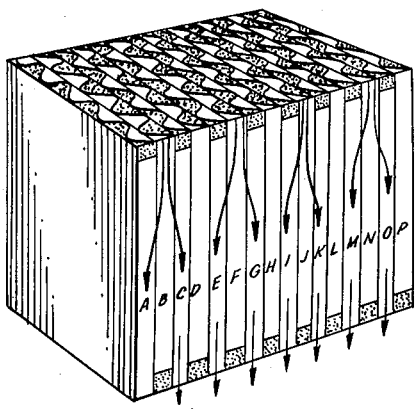
INVENTOR:
JORDAN V. BAUER
BY
ATT'YS United States Patent Office 3,025,963
Patented Mar. 20, 1962

3,025,963
PRODUCTS USEFUL AS FILTERING DEVICES
AND METHODS OF MAKING THEM
Jordan V. Bauer, 1001 Grand Ave., Keokuk, Iowa, assignor of forty-five percent to Russell H. Curtis, St. Charles, Ill., and ten percent to Richard L. Johnston, Arlington Heights, Ill.
Filed Mar. 13, 1958, Ser. No. 721,270
8 Claims. (Cl. 210—493)

This invention relates to an improved method of manufacturing filter devices of the type disclosed in U.S. Patent 2,599,604 and is directed to certain improvements in the fabrication of such filter devices, and to new and useful products.

U.S. Patent 2,599,604 disclosed a novel type of filter element using a corrugated filtering medium in a unique manner of construction. According to one way of making this filter element a strip of single faced corrugated filter paper, with confined flutes along one edge of the strip sealed shut, is wound convolutely on a core. As the strip is wound a sealing compound is extruded along the other edge of the strip so as to seal or plug the open flutes of the element during the winding operation. The final result of this procedure is a cylindrical paper assembly with the corrugations running parallel to the axis of the core, and with each of the flute passages through the element alternately plugged or sealed at one end, and open at the other end. Thus, any fluid that enters the open flutes at one end of the filter element has to pass through the filter paper comprising the side walls of the flutes to exit from the open flutes at the other end of the filter element.

By this means there is obtained a filter device which is compact in size, rigid in structure and large in filtering area. The drawback of this method of fabrication, however, has been that it has not proved practical for mass production methods of manufacture. Although the present invention can be used to manufacture a filter device of similar structure, it differs from the prior invention in that it presents an improved method of fabrication which avoids the difficulties involved in the former manufacturing procedure, and makes the mass production of such filter devices at low cost feasible.

One of the objects of the present invention, therefore, is to provide a new and improved process for making filtering devices of the type described.

Another object is to provide a flat product which can be cut to suit the needs of the user and is capable of being shipped and stored in the flat state. Such a product can be used as a flat filter, or multiples thereof can be placed side by side and used as a filter for gases or liquids. Moreover, this product can be rolled by the user into cylindrical form and inserted into a conventional cylindrical filter housing.

A further object is to provide a product of the type described in which elastomeric materials are used at least for blocking or sealing the open flutes of a filter made from a single-faced corrugated filtering medium and can also be used for sealing or blocking the confined flutes.

Other objects and advantages of the invention will be apparent from the following description in conjunction with the accompanying drawings, in which:

FIGURES 4 and 5 are plan views of portions of FIGURES 2 and 3;

FIGURE 6 illustrates one way of slitting and trimming the product produced;

FIGURE 7 illustrates the manner in which the flat product is wound into a cylindrical filter;

FIGURE 8 illustrates the manner in which the product shown in FIGURE 7 can be used as an oil filter, e.g., in an automobile;

FIGURE 9 illustrates a partial plan section of FIGURE 8;

FIGURE 10 illustrates the manner in which a product similar to that shown in FIGURE 7 can be used as an air filter, e.g., in an automobile to filter air going to the carburetor;

FIGURE 11 illustrates a multiple filter made in accordance with the invention;

FIGURE 12 illustrates a multi-layer flat filter utilizing the products of the invention.

Figure 1:
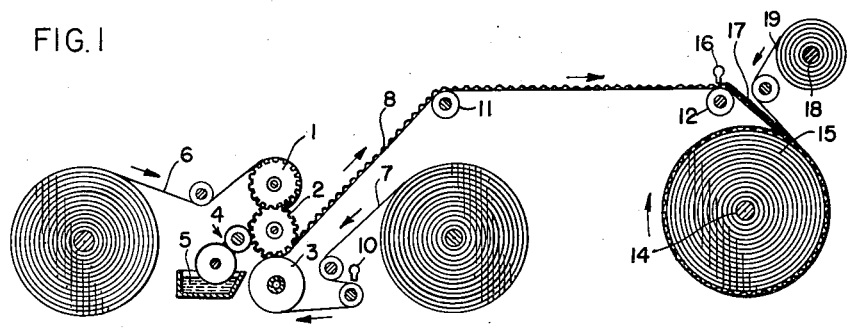
FIGURE 1 illustrates generally in elevation a form of apparatus suitable for practicing the process of the invention.

The new method of manufacture proposed in this invention also uses single-faced corrugated filter medium as the construction material for the filter element, but the procedure in forming the flute seals has been changed to overcome the drawbacks of the previous method. The present process also makes it possible to make a flat product which can be used as such or rolled as hereafter described.

Single-faced corrugated paper is a well known product as used for packaging and wrapping purposes. It is produced in large quantities by means of a machine known as a "corrugator" or "single-facer." It is manufactured by means of a high speed continuous operation which consists of corrugating one web of paper by means of heated fluted rolls, applying an adhesive to the tips of the corrugations and then bringing the corrugated web into contact with a flat web of paper and forming a bond between the two sheets. The result is a continuous sheet of so-called "single-faced corrugated paper" comprising a corrugated sheet bonded at the tips of the corrugations to a flat sheet of paper or so-called "liner." For the purposes of this invention a corrugating machine of the conventional type may be used to make up the single-faced corrugated filter paper used in the fabrication of the filter element.

One way in which this process differs from the prior invention of U.S. Patent 2,599,604 is that in the present invention the operation of forming the confined flute seals on one side of the corrugated filter strip is done simultaneously along with the corrugating operation, rather than subsequent to this operation, and the second operation of plugging the open flutes on the other side of the corrugated filter strip is done in such a way that the product can be unwound to a flat state and used in a flat state or rewound to form cylindrical filters. The final filter in either case consists of multiple layers of a single-faced corrugated material having predetermined flutes plugged or sealed as herein described.

In order to clarify the above explanation it should be understood that the term "confined" flutes is used to designate the flutes enclosed or confined between the corrugated and the flat sheets, whereas the term "open" flutes refers to the open or exposed flutes of the corrugated sheet.

By performing the confined flute sealing operation simultaneously at the time the sheet is being corrugated, and performing the open flute sealing operation in the manner herein described, three important advantages are achieved over the prior method of fabrication.

First, it makes practically the multiple production of the corrugated filter winding strips from a single wide width of the corrugated sheet. Second, by eliminating the necessity of making the open flute seal during the final convolute winding operation, that operation is no longer "messy" and complicated, but instead becomes a simple "dry" winding procedure which can readily be handled on a mass production basis. Third, it makes it possible to use conventional existing types of paper fabricating machinery to perform all of the major manufacturing operations involved.

A primary feature of the invention, therefore, is a method of preparing a sheet of single-faced corrugated filter medium complete with both confined and open flute seals formed in situ at the proper locations, so that the sheet may be trimmed and slit to give either one or a multiple of individual filter winding strips, each with both confined and open flute seals completed and ready for the operation of being wound on a core to form a filter element.

Another feature of the invention is the production of a product, suitable for the construction of filter elements when convolute wound on a core, consisting of a strip of single-faced corrugated filter medium with the confined flutes along one edge sealed shut and the open flutes along the other edge filled in level with the top of the corrugations by means of an elastomeric sealing compound.

A further feature of the invention is the production of corrugated filter elements suitable for the filtration of both liquid and gaseous fluids by the methods of fabrication herein disclosed.

Figure 2:
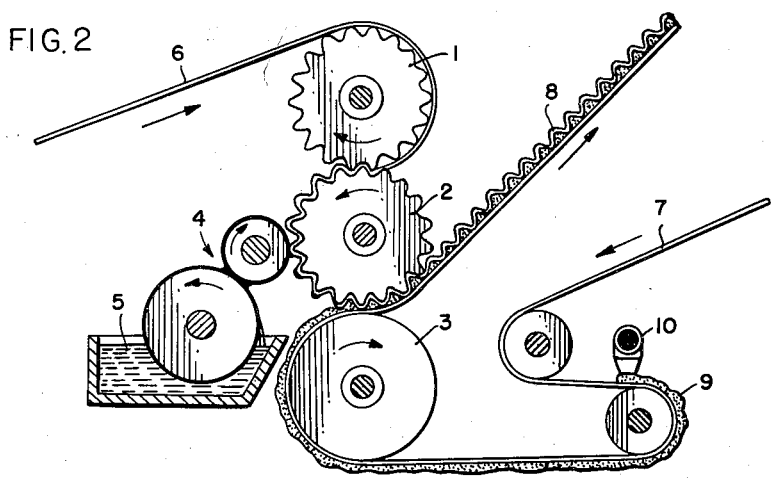
FIGURE 2 is an enlarged view of a portion of FIGure 1.
Figure 3:
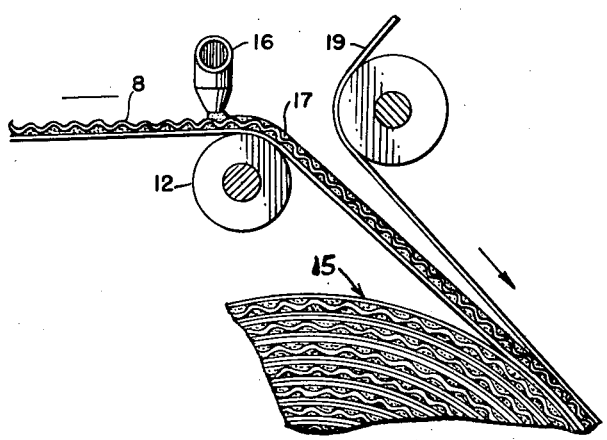
FIGURE 3 is an enlarged view of another portion of FIGURE 1.

In referring to FIGURES 1, 2 and 3 illustrating the invention, FIGURE 1 is a diagram which illustrates the method of fabricating a corrugated filter paper and the forming of the flute seals. It also demonstrates the function and relationship of the various equipment components. FIGURE 2 is an enlarged detail showing the corrugating machine and the method forming the "confined" flute seals. FIGURE 3 is an enlarged detail showing the method of forming the "open" flute seals. FIGURES 4 and 5 show plan views of parts of FIGURES 2 and 3. In FIGURES 1 to 5 the same reference numbers are used in each drawing when used to designate the same part.

FIGURE 2 shows a diagram of a typical corrugating machine. It comprises essentially of two fluted corrugating rolls 1 and 2, mounted one above the other with a smooth surfaced so-called "pressure roll" 3 running in contact and parallel to the lower corrugating roll 2. All of these rolls are steam heated to about 350° F. so as to facilitate molding the paper. Adjacent to the lower corrugating roll 2 is a conventional roller type mechanism 4 adapted to apply an adhesive 5 to the tips of the corrugations of the corrugated paper sheet 6 as it passes through the machine.

FIGURE 2 also illustrates the manner in which the filter paper is made up into a single-faced corrugated sheet and the method forming the confined flute seals simultaneous with the corrugating operation. In producing the corrugated filter sheet the paper is fed into the machine from two rolls of filter paper mounted on roll stands adjacent to the corrugating machine. One sheet 6 is passed between the upper and lower corrugating rolls 1 and 2 where it is molded into corrugations, and then passes around the lower corrugating roll 2 and out of the machine between the lower corrugating roll 2 and the pressure roll 3.

As the corrugated sheet 6 passes down around the lower corrugating roll 2, an adhesive 5 is applied to the tips of the corrugations by means of an adhesive applicator mechanism 4. The other sheet of filter paper 7 is fed into the machine so as to pass between the pressure roll 3 and the lower corrugating roll 2 and meets the corrugated sheet 6 at this point. The adhesive bond between the corrugated and the flat sheet of filter paper is thereby formed, and the assembly passes out of the machine in the form of a continuous sheet of single-faced corrugated paper 8, comprising a corrugated sheet of paper faced on one side with a flat sheet of paper. The adhesive 5 used in the corrugating operation is preferably a conventional starch paste of the type commonly used for corrugating purposes as described in my United States Patent 2,051,025.

As the means of providing an area of closure or a seal within the confined flutes of the single-faced corrugated sheet, a narrow ribbon or fillet of a sealing compound 9 is applied to the inside surface of the flat or "liner" sheet 7, just before it goes into the corrugating machine. This sealing compound 9 is extruded onto the paper by means of an extruding nozzle 10 as is shown in the drawing. The amount of sealing compound 9 applied, is so regulated that when trapped between the corrugations and the liner, each confined flute is filled in and plugged to form a seal about ⅜ to ½ inch wide running the length of the sheet.

For practical reasons it is usually desirable to make two or more of these seals, starting close to one edge of the sheet and spacing them across the width of the sheet at a distance equal to double the width of the finally desired filter element winding strips. As shown in FIGURE 4, a second nozzle 10a is provided to extrude the second confined seal. By using two confined flute seals in combination with one open flute seal, for example, a single wide sheet can be trimmed and slit to give two individual filter element winding strips, whereas with three confined flute seals and two open flute seals, four winding strips could be obtained from a single wide sheet of the corrugated paper. The width of the paper used should be selected of course so that a minimum amount of material would be lost in side trim.

For purposes of illustration the use of two "confined" flutes and one "open" flute seal was chosen to demonstrate the practice of this invention. To make each of these seals a separate nozzle is required for extruding the sealing compound, only one, however, of the two nozzles required for the two confined flute seals is visible in the diagrams in FIGURES 1 and 2 which illustrate the invention, the second nozzle being shown in FIGURE 4.

As is illustrated in FIGURE 1, the single-faced sheet of filter paper 8, complete with two confined flute seals, after passing out of the corrugating machine is carried over a series of guide rolls 11 and 12 to a winding machine 14 where it is wound into a large roll 15. This winding operation is performed under sufficient tension to keep the corrugated sheet 8 fairly taut as it is being wound. Just previous to the roll winding machine 14, is located the means for making the "open" flute seal. This consists of an extrusion nozzle 16 whereby a narrow ribbon or fillet of sealing compound 17 is applied to the open flutes of the corrugated sheet 8, at a position midway between the closed flute seals.

Adjacent to, and in line with the extrusion nozzle 16, is located a roll stand 18 holding a roll of narrow tape 19 about 1 to 1½ inches wide. This tape 19 is composed of paper or other thin sheet material so coated or impregnated with wax or other impervious material as to make it non-adherent to the sealing compound. The roll of tape 19 is so located that as the corrugated sheet 8 is being wound, the tape 19 is also wound along with the corrugated sheet 8, in line with the fillet of applied sealing compound, so that the sealing compound 17 is trapped between the corrugations and the "barrier" formed by the tape 19. The amount of sealing compound 17 applied is so regulated that when thus confined between the corrugations and the tape 19 a section of each of the open flutes is filled in level with the tops of the corrugations for an area of about ⅜ to ½ inch wide, running the length of the sheet. After a full roll of the corrugated paper and tape assembly 15 has been wound the sheet is cut off and a new roll started. This completed roll is then tied so that it will not unwind and is set aside to age for 24 hours or more to allow the sealing compound to cure.

After the sealing compound has cured the next step in the procedure is to unwind the roll of corrugated paper 15 and then slit the sheet into two individual filter winding strips. As the roll is unwound the barrier tape 19 is stripped from the corrugated sheet and discarded. The corrugated sheet is then passed through a paper slitting machine where the edges are trimmed and the sheet slit lengthwise down the middle of each sealed area. As a result of this operation two filter winding strips are obtained, each one with the confined flutes along one edge plugged shut and the open flutes along the other edge filled in level with the tops of the corrugations. FIGURE 6 shows a section of the single-faced corrugated filter sheet 20 with two confined seals 21 and 22 and one open seal 23, and illustrates how the sheet is trimmed and slit to given two filter winding strips 24 and 25.

The next operation consists of cutting the filter winding strips into lengths as required for the desired filter elements. Each length constitutes the paper materials for an individual element, and when convolutely wound on a core to form a cylindrical unit with the corrugations running parallel to the axis of the core, each of the flute passages through the unit will be alternately plugged at one end and open at the other end. The assembled unit therefore meets the requirements of an effective filter device in that any fluid entering the open flutes at one end of the unit must pass through the filter paper comprising the walls of the flute before emitting from the open flutes at the other end of the unit.

The drawing in FIGURE 7 illustrates the manner in which a corrugated filter winding strip 26, with the confined flutes 27 sealed along one edge and the open flutes 28 filled in along the other edge, is convolutely wound on a core 29 to form the filter element. One method of construction in winding the corrugated filter strip on the core is to paste or otherwise fasten leaders and tail strips to the corrugated filter strip so as to facilitate attaching the one end of the strip to the core and the other end to the body of the element when the winding operation is completed. In FIGURE 7 the tail strip 30 is shown as attached to the corrugated filter strip 26. In starting and ending the winding of the filter strip 26 a dab of sealing compound is used to seal the gap that occurs at the junction of the corrugated filter strip with the leader and tail strips.

A preferred method of construction, where considerable fluid pressures are to be encountered, is to wind the filter element to such a diameter that it is a snug push fit into a cylindrical metal container. By thus enclosing the paper structure it will withstand high fluid pressures without rupturing. FIGURE 8 illustrates, in elevation and partly in cross-section, a filter using this type of construction wherein the corrugated filter paper element 31 is wound on a tubular core 32 and enclosed in a cylindrical metal can 33. The bottom 38 of the can 33 is provided with spaced projections 39 which retain the filter element in a spaced position above the bottom. (See also FIGURE 9.) This forms a filter element cartridge adapted for use in a conventional automotive oil filter housing of the center post type. The openings 34 and 35 permit mounting the filter cartridge on the center post and gaskets 36 and 37 act as seals. The arrows in the drawing indicate the path of oil flow through the cartridge.

FIGURE 10 illustrates, in elevation and partly in cross-section, a filter adapted for air filtration. In this example, the corrugated paper filter element 40 is wound on a tubular core 41 and enclosed in a metal housing 42. The arrows in the drawing show the path of air flow through the filter unit.

These examples illustrating the use of the invention should not be construed as limiting the use of the invention to the particular purpose or structure chosen to demonstrate practice of the invention. The filter element of this invention is suitable for other filtration purposes than those illustrated. While different applications would require some changes in design, these changes would be of such nature that they could be applied by any one familiar with the art. As a variation, the filter element may be wound on a solid or closed core, and mounted in a housing designed for a straight flow through the filter element, rather than using the hollow core arrangement demonstrated in the examples.

Another example of a variation in design that would still be within the concept of the invention, would be the construction of a filter element having two stages of filtration in a single unit. This result could be obtained by not slitting the single-faced corrugated filter sheet (as shown in FIGURE 6) into two separate filter winding strips. By leaving it intact, complete with its two confined flute seals and one open flute seal, and then winding it convolutely on a core, a filter element would be obtained that would have two stages of filtration in series contained in a single unit, as shown in FIGURE 11. For some purposes a dual or multistage filtration device may be more desirable than a single stage unit.

FIGURE 12 illustrates how a flat filter can be assembled from a plurality of flat filter elements A to P, each like 24 and 25 but united flat and with alternate ends reversed. The assembly is fitted snugly in a rectangular container.

The sealing compounds used for the purpose of this invention are an important factor in the successful application of the method of fabrication, and must meet certain requirements in order to perform satisfactorily for this purpose. These requirements apply particularly to the sealing compound used to form the open flute seals. In the case of the confined flute seals a much greater latitude is allowable and the requirements are not so critical.

The properties required in a sealing compound to be used for the open flute seals are as follows:

(1) It must have negligible shrinkage during curing to assure complete sealing and plugging of the flutes;

(2) It must be sufficiently fluid or flowable to be applied to the filter medium, and yet be sufficiently thixotropic in character that it will not flow out of position after being applied;

(3) It should be curable or capable of setting to a substantially immobile state;

(4) When cured the sealing compound must be flexible and rubberlike in character so that the filter winding strips can be flexed in the winding operation without fracture of the filter medium or the seals;

(5) When cured it must have sufficient strength to maintain an effective seal under any pressure conditions likely to be encountered;

(6) When cured the sealing compound must withstand any range of temperature conditions to which the filter unit might be subjected;

(7) It must withstand deterioration from oil, water or other fluidls likely to come in contact with the filter element;

(8) It is desirable that the temperature required for curing the sealing compound be low enough that excessive heating of the filter assembly is not required.

Available sealing compounds which are suitable for the purposes of this invention and which meet the requirements outlined above are the liquid types of polysulfide polymers, as described in Industrial and Engineering Chemistry, vol. 43, No. 2, pp. 324 to 328 (February 1951) which is incorporated herein by reference. Commercial products of this type are manufactured by the Thiokol Chemical Corporation of Trenton, N.J. They are sold under the trade names of Thiokol LP-2 and Thiokol LP-3. These liquid polymers with the addition of a curing agent will convert to tough solvent resistant synthetic rubbers at room temperatures. For the purposes of this invention these materials are so compounded as to give a sealing compound fluid enough to be extruded onto the moving web of paper, but sufficiently thixotropic that it will not flow out of position after being applied. An example of the formulation of a suitable sealing compound for the purposes of the invention is as follows:

Base Compound

| | |
|---|---|
| "Thiokol" liquid polymer LP–2 | 100 |
| Semi-reinforcing carbon black | 30 |
| Stearic acid | 1 |
| | 131 |

Curing Compound

| | |
|---|---|
| Lead peroxide | 50 |
| Stearic acid | 5 |
| Dibutyl phthalate | 45 |
| | 100 |

The base compound is mixed by means of a 3-roll paint mill. The curing compound is made by dispersing the lead peroxide in the dibutyl phthalate on a 3-roll paint mill. The stearic acid is used to body up the mix and keep the lead peroxide from settling.

The sealing compound is prepared for use by thoroughly mixing the curing compound with the base compound in the ratio of 15 parts of curing compound to 130 parts of base compound. The mixed compound has a working life of about 3 to 4 hours and at a temperature of about 80° F. cures in about 24 to 48 hours.

The above described sealing compound is suitable for both the open and confined flute seals. In the case of the confined flute seals, however, the sealing compound requirements are not as critical as those of the open flute seals. For example, it is not essential that the sealing compound used for the confined flute seals be of a flexible or elastomeric nature because when used in this position a non-flexible sealing compound does not prevent the flexing of the corrugated sheet. The sealing compound used for forming the confined flute seals is, therefore, not necessarily limited to the elastomeric type of compound required for the open flute seals, but may consist of a less complex sealing material. Examples of such sealing materials would be polyvinyl acetate polymer emulsions, and synthetic resin adhesives of the urea-formaldehyde and phenol-formaldehyde type. Other suitable sealing adhesives or compounds will be apparent to those familiar with the art. Additional means of supplementing the closure of the confined flute seals would be by crushing or flattening the corrugations of the single-faced corrugated sheet along the area of the confined flute seals by means of pressure applied to those areas when the single-faced corrugated sheet emerges from the corrugating machine. The confined flutes can also be closed by seams such as shown at 5 in FIGURE 1 of U.S. 2,599,604.

The paper or other fibrous sheet materials used for the purposes of this invention should be of such porosity as to be suitable for the filtration usage involved. It would preferably be prepared in the paper mill to meet such specifications as: fiber composition and structure, porosity, caliper, bursting strength, etc. Further requirements might be treatments with synthetic resins or other materials for the purpose of imparting water resistance, wet strength, stiffness or other desirable properties to the filter paper sheet.

It will be understood that the filtering unit disclosed herein is not limited to filtering the oil in automotive engines. The unit is also well adapted for filtering other types of fluids or for removing entrained particles in gases. While different applications of this nature would require minor changes in design and possibly different materials of construction, these changes are considered to be of a nature that anyone familiar with the art can apply. For example, the corrugated filter element may be fabricated from sheets of glass fiber mat or cloth rather than from paper, and the core of the filter element may be made of metal, plastic or glass. By employing these different materials of construction, it is possible to adapt the broad concept of this invention to an innumerable number of practical applications.

The invention is hereby claimed as follows:

1. A process of manufacturing a filter element which comprises continuously corrugating a continuous strip of sheet material, applying adhesive to the tips of the corrugations of said sheet material, continuously applying a relatively thick, narrow strip of a sealing composition to a continuous sheet of liner material in a predetermined relatively narrow area running lengthwise of said sheet of liner material, said corrugated material and said liner material being permeable to fluids but substantially non-permeable to solids, continuously bringing said liner material into contact with said corrugated sheet material so that it adheres thereto at the tips of the corrugations by means of said adhesive and the confined flutes between the corrugated sheet and the liner sheet are plugged by said sealing composition in said predetermined area, continuously filling the flutes on the surface of the corrugated sheet which is opposite the surface adjacent the liner with a flowable elastomeric sealing composition in a predetermined relatively narrow area running lengthwise of said sheet but spaced transversely from said first mentioned predetermined area containing said first mentioned sealing composition, said elastomeric sealing composition being one which sets on standing to a flexible substantially immobile seal which is impermeable to fluids, continuously covering said elastomeric sealing composition with a strip of a removable barrier sheet running lengthwise, said barrier sheet being adapted to be stripped from said elastomeric composition after the latter is set, winding said combined corrugated sheet and liner containing said barrier sheet into a roll, allowing the elastomeric composition in said roll to set, thereafter unwinding said roll and removing said barrier sheet, and rewinding said corrugated sheet material containing said sealing composition into a convolute filter element.

2. A method of manufacturing a paper product for filtration purposes which comprises making a single-faced corrugated sheet from filter paper and simultaneously with the corrugating operation sealing shut the confined flutes in selected areas running the length of the sheet by means of a sealing compound, and then subsequently filling in the open flutes of the corrugated sheet level with the tops of the corrugations, at selected distances from the confined flute seals by means of an elastomeric sealing compound, and after the sealing compound has cured, slitting the sheet lengthwise down the middle of each of the sealed areas to produce two or more individual filter strips each having the confined flutes sealed along one edge and the open flutes along the other edge filled in level with the tops of the corrugations by means of said sealing compound.

3. A product suitable for use in making filter elements which comprises a corrugated sheet material united at the tips of the corrugations to a liner sheet material thereby forming confined flutes between the corrugated sheet material and the liner sheet material and open flutes on the surface of the corrugated sheet opposite the surface united to said liner, said sheet materials being permeable to fluids but substantially nonpermeable to solids and capable of acting as a filtering media, the confined flutes being sealed in a predetermined area and the open flutes being filled in level with the tops of the corrugations by means of an elastomeric sealing composition in another predetermined area spaced from said first predetermined area, said elastomeric sealing composition being flexible in character so that said product can be wound without fracture of said permeable sheet materials and without fracture of the seal produced by said sealing composition.

4. A product as claimed in claim 3 in which the elastomeric sealing composition is provided with means to prevent said elastomeric sealing composition from adhering to said liner sheet when the resultant material is wound convolutely with the corrugations facing inwardly.

5. A paper product suitable for fabricating filter elements which comprises a strip of single-faced corrugated filter paper with the confined flutes sealed shut adjacent one edge and the open flutes adjacent the other edge filled in level with the tops of the corrugations by means of an elastomeric sealing composition which is flexible in character so that said product can be wound without fracturing the filter paper and without fracturing the sealing composition.

6. A paper product as claimed in claim 5 in which the elastomeric sealing composition is covered with a strip of a material so that the elastomeric composition before it is set does not come directly in contact with surfaces rather than said strip and said flutes.

7. A filter element consisting of multiple layers of the product of claim 3.

8. A filter element constructed of a product as claimed in claim 3 convolutely wound to form a cylindrical filter unit.

References Cited in the file of this patent

UNITED STATES PATENTS

| | | |
|---|---|---|
| 2,121,872 | Hazell | June 28, 1938 |
| 2,502,545 | Wellborn | Apr. 4, 1950 |
| 2,599,604 | Bauer | June 10, 1952 |
| 2,720,937 | Root | Oct. 18, 1955 |
| 2,726,184 | Cox | Dec. 6, 1955 |
| 2,732,031 | Rabbitt | Jan. 24, 1956 |
| 2,749,265 | Fricke | June 5, 1956 |
| 2,883,058 | Jaume | Apr. 21, 1959 |

FOREIGN PATENTS

| | | |
|---|---|---|
| 377,572 | Great Britain | July 28, 1932 |
| 764,846 | Great Britain | Jan. 2, 1957 |
| 770,439 | Great Britain | Mar. 20, 1957 |
| 177,423 | Austria | Jan. 25, 1954 |
| 1,106,115 | France | July 13, 1955 |

OTHER REFERENCES

"Industrial and Engineering Chemistry," vol. 43, No. 2, pp. 324–328, February 1951.

UNITED STATES PATENT OFFICE
CERTIFICATE OF CORRECTION

Patent No. 3,025,963                          March 20, 1962

Jordan V. Bauer

It is hereby certified that error appears in the above numbered patent requiring correction and that the said Letters Patent should read as corrected below.

Column 5, line 33, for "constructicon" read -- construction --; column 9, line 16, for "rather" read -- other --.

Signed and sealed this 31st day of July 1962.

(SEAL)
Attest:

ERNEST W. SWIDER
Attesting Officer

DAVID L. LADD
Commissioner of Patents